May 2, 1939. F. E. HUGGINS, JR 2,156,853
THERMOCOUPLE
Filed March 17, 1938
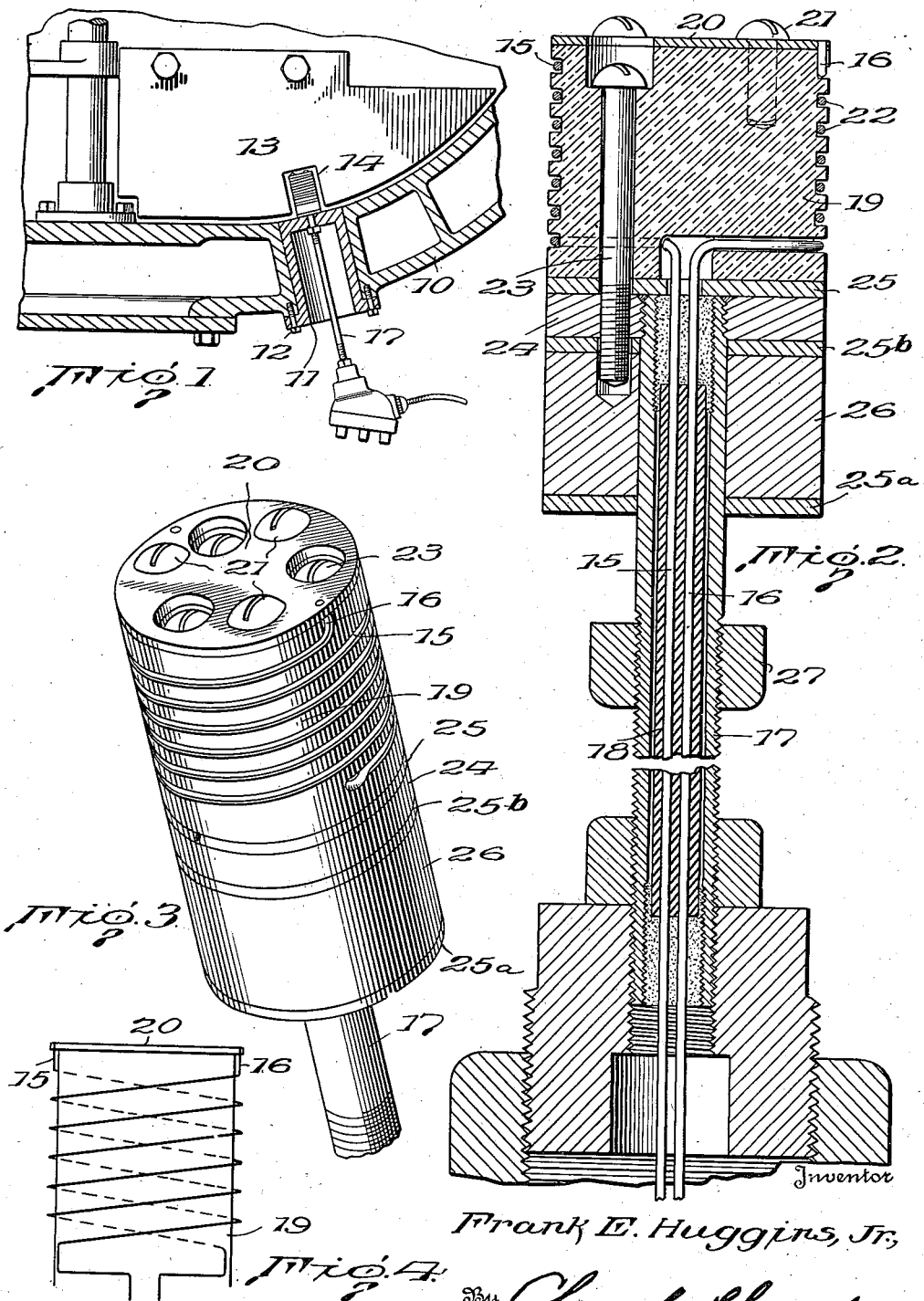
Inventor
Frank E. Huggins, Jr.
By Church & Church
His Attorneys Patented May 2, 1939

2,156,853

UNITED STATES PATENT OFFICE 2,156,853

THERMOCOUPLE

Frank E. Huggins, Jr., Buffalo, N. Y., assignor to Sowers Manufacturing Co., Buffalo, N. Y., a corporation of New York Application March 17, 1938, Serial No. 196,561

9 Claims. (Cl. 136—4)

This invention relates to temperature-indicating devices and, particularly, to an improved thermocouple.

In certain types of processing apparatus, such as those which are provided with agitating mechanisms of the type known as a sweep-type agitator, there is practically no space for the installation of the customary type of thermocouple, thermometer or other temperature-indicating device, capable of accurately denoting the temperature of the material undergoing treatment in the processing chamber. The agitating mechanism is usually such that the temperature-indicating device cannot be suspended for a sufficient distance from the top of the processing chamber into the material being processed, or through the side of the chamber, but it can only be installed through the bottom of the chamber in which case the bottom vertical blade of each of the agitators is slotted to clear the temperature device projecting into the chamber. However, with thermometers and also thermocouples of the prior are installed within processing apparatus through the lower portion of the processing chamber wall, the temperature readings are found to be affected by the wall of the processing chamber unless they are allowed to project so far into the interior of the chamber or into the material being processed as to necessitate changes in construction of the agitator blades such as will interfere or detract from the efficiency of agitation. This is due to the fact that, with a temperature device projecting only a short distance into the interior of the processing chamber, and with the wall of the chamber at a temperature higher than that of the material being processed, heat from the wall is conducted by the temperature-measuring device to the sensitive part of the device and heats it to higher than the true or actual temperature of the material whose temperature is to be measured. Conversely with the device projecting only a short distance into the interior of the processing chamber from the wall of said chamber, and with the wall at a temperature lower than that of the material whose temperature is to be measured, heat is conducted from the temperature-measuring device from the sensitive part thereof to the chamber wall and, as a result, the sensitive part of the device is cooled to a point below the true temperature of the material whose temperature is to be measured. On the other hand, with the temperature-measuring device projecting into the the processing chamber sufficiently far from the wall thereof, heat received by the device from the hotter wall of the processing chamber is dissipated to the material surrounding the device instead of being carried to the sensitive part of the device and conversely cooling of the sensitive part of the device which would occur where the wall of the chamber is below that of the material being processed is prevented by heat absorbed from the material surrounding the device. However, while an instrument of such a length will possess greater accuracy, nevertheless, as just stated, it necessitates changes which interfere with good agitation. For instance, these changes might consist of making the bottom vertical blade of the agitator of greater height so that a longer slot may be provided therein for clearing the long projection of the temperature device but with the bottom vertical blade made too high, material opposite such blade would be carried around in the processing chamber in a mass, as distinguished from a short bottom vertical blade which works through the material and rearranges the particles thereof in different relations to each other, thus effecting a more efficient agitation.

In view of the foregoing, one object of the invention is to provide a thermocouple capable of giving accurate readings of the temperature of the material by which it is surrounded while said material is being processed, regardless of the temperature of the wall or other structural element of the processing chamber through which the thermocouple is installed, and without interfering with efficient operation of the agitating mechanism within the processing chamber.

A further object of the invention is to provide a thermocouple adapted to be installed through the wall of a processing chamber, said thermocouple projecting a comparatively short distance into the processing chamber but still being capable of accurately indicating the temperature of the material being processed by reason of the fact that the thermocouple conductors are of considerably greater length than the distance the device projects into the chamber, thus permitting heat transferred from the chamber wall to said conductors to be dissipated to the material being processed where the wall is hotter than the material and, likewise, permitting the material being processed to offset any tendency of a cooler chamber wall to affect the sensitive part of the instrument.

More specifically, the invention contemplates a thermocouple consisting essentially of a body of insulating material, adapted to be positioned within the processing chamber at a comparatively short distance from the chamber wall, said insulating material carrying the two thermocouple conductors with the latter arranged thereon in tortuous pairs or lines, so that the length of the conductors carried by said insulating material is considerably greater than the length of the said body of material itself. This body of insulating material, which may preferably be a refractory material, composes the inner end, so to speak, of the thermocouple and the extremities of the conductors at said inner end are associated in a thermo-electric junction, commonly termed the "hot" junction of the instrument, said conductors leading from said insulating body through a tubular member on which said body is mounted and which tubular member forms a stem adapted to extend through and be mounted in the wall of the processing chamber to properly locate said insulating material and the thermo-electric junction of the conductors within the processing chamber where it will be surrounded by the material being processed and whose temperature is to be measured.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a sectional view through the wall of a processing chamber, illustrating, rather generally, a thermocouple of the present design installed therein;

Fig. 2 is a longitudinal sectional view, partly broken away, of the present thermocouple;

Fig. 3 is a perspective view of the present instrument; and

Fig. 4 is a diagrammatical illustration of the wiring of the present instrument.

While the present instrument is susceptible of use in various types of apparatus, it is illustrated, in the present instance, in connection with a processing kettle having a steam-jacketed wall 10, provided with an opening in which a closure member 11 is removably secured by suitable fastening means such as studs or capscrews 12, said closure member being provided with an opening therethrough for reception of what will be termed the stem of the present thermocouple. As illustrated in Fig. 1, the thermocouple projects upwardly through the closure member 11 which, in this instance, constitutes a portion of the inner surface of the kettle wall and the bottom vertical agitator blade 13 of the agitating mechanism is cut away as at 14 to provide clearance for the thermocouple. As previously indicated, it is desirable that the thermocouple project into the processing chamber as short a distance as possible in order to eliminate the necessity of using a bottom vertical agitator blade of undue height such as would reduce the efficiency of the agitating mechanism. At the same time, as also pointed out, it is necessary that the sensitive part of the instrument should not be affected by any differences in the temperature of the material being processed and the temperature of the processing chamber wall. Therefore, in the present instrument, the thermocouple conductors 15, 16, are arranged in a tortuous path between the wall of the chamber and the innermost end of the thermocouple at which point said conductors are associated in a thermo-electric junction.

In the preferred embodiment of the invention illustrated in the present instance, the conductors 15, 16, extend through a tubular stem 17 being properly insulated from each other and from the wall of the chamber by being embedded in an insulating material 18, preferably refractory material, for the greater portion of their length within the stem 17. At the inner end of the stem, or that end of the stem which is normally positioned within the processing chamber, said conductors diverge and extend through a body of insulating material 19 to the peripheral surface of the latter and then extend along said surface in a tortuous path to the innermost end thereof at which point they are associated in the thermoelectric junction. The inner extremities of the conductors need not necessarily be brought into actual physical contact with each other, as they may, if desired, be brazed to a metal disc 20 secured to the inner end of the insulating material 19 by screws 21. Preferably, the conductors 15 and 16 are wound in spiral grooves formed in the peripheral surface of the body of material 19, but the essential point is that the disposition of the conductors on the surface of said body is such that their length greatly exceeds that of the body itself. In other words, by winding the conductors in a spiral path, their length is not limited by the distance the body 19 projects into the processing chamber but, on the contrary, they can be made long enough to insure dissipation of any heat that may be conducted to them by the chamber walls, these heat units being dissipated to the surrounding material under treatment before they can be conducted to the thermoelectric junction which, of course, is the sensitive part of the instrument. On the other hand, if the chamber wall is cooler than the material being processed, the length of the conductors is such that the temperature of the material will offset the cooling effect of the wall. Preferably, the grooves 22, in which the conductors are laid, are of sufficient depth as to protect the conductors, the conductors actually lying below the surface of the body 19 and the spacing of the grooves should be such as to properly insulate the two conductors one from the other.

In the present instrument, the body of insulating material 19 is secured by screws 23 to a metal disc 24 threaded, and also preferably welded, on the inner end of the stem 17, a gasket 25 of suitable material being interposed between said disc 24 and the body 19. In order to permit the instrument to seat firmly against the inner end of the closure member 11, a metallic spacer block 26 may be provided on the stem 17 adjacent the disc 24, a second gasket 25$^b$ being interposed between said spacer 26 and the disc 24. The instrument is adapted to be secured firmly in position by a clamping nut 27 threaded on the stem 17 of the instrument. At its exterior end the stem 17 is provided with suitable means for connecting the instrument, through the conductors 15, 16, to any one of various forms of indicating or recording instruments; for instance, such as a recording thermo-electric pyrometer (not shown). A gasket 25$^a$, similar to gasket 25, may also be used at the base of spacer 26 for effecting a perfect fit between the instrument and closure member 11.

As previously indicated, the essential point is that, while the hot junction of the instrument is located comparatively close to the wall of the kettle or other processing chamber, nevertheless, the temperature of said junction will correspond to the surrounding material in the chamber undergoing treatment because, as explained, the length of the conductors between the wall and the hot junction is such that heat units exchanged between the chamber wall and said conductors will be dissipated to the material undergoing treatment before they can reach the hot junction and, on the other hand, where the wall in the processing chamber is of a temperature below that of the material undergoing treatment, the length of the conductors between the junction and wall permits the material being treated to prevent the flow of heat units from the junction to the wall. As to the details of construction of the instrument, they can be varied in quite a few particulars. For instance, the conductors may be made of copper and constantan, or of iron and constantan, or of chromel and alumel. The insulating body 19 is preferably, but not necessarily, a ceramic insulating material or porcelain, while the disc 24 is preferably made of cold rolled steel, where constantan wires and copper or iron wires constitute the conductors. If desired, disc 24 may be made of stainless steel, nickel or the like. The gaskets 25 are preferably made of a sheet gasket material and the body 26 may be made of brass, where constantan wires with copper or iron wires are used as conductors. With cromel and alumel conductors, member 26 is preferably made of stainless steel, although, in some instances, depending upon the corrosive action of the chemical in contact with the thermocouple, other metals might be more efficient. The insulator surrounding the conductors within the stem 17 may be any suitable insulating material, a ceramic material being preferred, although cotton or rubber may be used. At the ends of the stem, the latter may be filled with a cement containing powdered porcelain. It will, of course, be appreciated that other variations in the materials used are possible, depending upon the conditions to be met. For instance, if brass should be objectionable in the interior of the processing chamber, other material having sufficient strength and capable of being filed or otherwise altered to conform to the contour of the chamber wall, such as steel or lead, could be used.

The material of which disc 20 is made will depend upon the materials used for the thermocouple wires. For instance, where copper and constantan are used for the respective wires, disc 20 is preferably made of copper, and where the wires are made of iron and constantan, said disc is made of iron, while if the wires are made of cromel and alumel, the disc is preferably made of nickel. The several gaskets, indicated at 25, 25ª, and 25ᵇ, are preferably made of a sheet gasket material now placed on the market by The Durabla Manufacturing Company, under the trade-name "Durabla."

What I claim is:

1. In a thermocouple, a body of insulating material adapted to project into the interior of a processing chamber, and thermocouple conductors arranged circumferentially of said body between the ends thereof with the ends of said conductors associated in a thermo-electric junction at the inner end of said body, the length of said conductors carried by that portion of said body disposed within the chamber exceeding the distance said body extends into said chamber whereby dissipation of heat units exchanged between said conductors and the wall of said chamber to material within said chamber will be facilitated.

2. In a thermocouple, the combination of a tubular stem adapted to project through the wall of a processing chamber into the interior thereof, a body of insulating material carried by said stem, and thermocouple conductors extending through said stem to the exterior surface of said insulating body, said conductors being disposed circumferentially of said exterior suface and associated with each other adjacent one end of said body to form a thermo-electric junction therebetween, the distance between said junction and the point at which said conductors enter said chamber being greater than the distance said insulating body projects into said chamber.

3. In a thermocouple, a tubular stem, a body of insulating material secured at one end to said stem, thermocouple conductors extending through said stem to the exterior of said body and along the surface of said body in tortuous paths to the opposite end of said body, and a metal disc secured to said opposite end of said body, an extremity of each of said conductors being attached to said disc to form a thermo-electric junction between said conductors.

4. In a thermocouple, an elongated body of insulating material, means attached to one end of said body for supporting the same at the interior of the wall of a processing chamber with said body projecting into said chamber, an enlarged metal disc secured to the opposite end of said body, and thermocouple conductors disposed in separate tortuous paths on the surface of said body and electrically insulated from each other, one extremity of each conductor being connected to said disc to form a thermo-electric junction between said conductors.

5. In a thermocouple, a body of insulating material having depressions extending spirally of its periphery from one end thereof, a metal disc mounted on said end of said body, means attached to the opposite end of said body for supporting the same in the interior of a processing chamber, and thermocouple conductors disposed in said spiral depressions and connected to said disc to form a thermo-electric junction between said conductors.

6. In a thermocouple, an elongated body of refractory insulating material having tortuous depressions in its peripheral surface extending from one end thereof, a metallic disc attached to said end of the body, supporting means attached to the opposite end of said body for supporting said body in the interior of a processing chamber, and thermocouple conductors extending through said supporting means and along separate depressions in said body to said disc, said conductors being connected to said disc to form a thermo-electric junction between said conductors.

7. In a thermocouple, an elongated body of refractory insulating material having separate spiral grooves in its exterior surface, thermocouple conductors disposed in said grooves and extending to one end of said body, means forming a thermo-electric junction between said conductors at said end of said body, and means for supporting said body from the wall of a processing chamber in spaced relation to said wall.

8. In a thermocouple, a tubular stem adapted to extend through the wall of a processing chamber, a metal disc attached to one end of said stem, a spacer member secured on said stem at one side of said disc, a body of refractory insulating material carried by said stem at the opposite side of said disc, said body having spirally arranged grooves extending longitudinally of its peripheral surface, and thermocouple conductors extending through said stem into and along said grooves, said conductors being associated in a thermo-electric junction adjacent the end of said refractory body remote from said stem.

9. In a thermocouple, a tubular stem adapted to extend through the wall of a processing chamber, a metal disc attached to one end of said stem, a spacer member on said stem at one side of said disc, a body of refractory insulating material carried by said stem at the opposite side of said disc, said body having spirally arranged grooves extending longitudinally of its peripheral surface, thermocouple conductors extending through said stem and grooves to the end of said refractory body remote from the stem, and a conductor disc secured to said remote end of the refractory body, said conductors being connected to said conductor disc to form a thermo-electric junction between said conductors.

FRANK E. HUGGINS, Jr.